(12) United States Patent
Russow

(10) Patent No.: US 6,640,484 B1
(45) Date of Patent: Nov. 4, 2003

(54) FISHING LINE LOADING DEVICE

(76) Inventor: Charles M. Russow, 1894 Anderson La., West Palm Beach, FL (US) 33406

( * ) Notice: Subject to any disclaimer, the term of this patent is extended or adjusted under 35 U.S.C. 154(b) by 0 days.

(21) Appl. No.: 09/653,125

(22) Filed: Aug. 31, 2000

(51) Int. Cl.[7] .............................................. A01K 87/00
(52) U.S. Cl. ........................................................ 43/25
(58) Field of Search .................... 43/25, 18.1; 242/902, 242/404.2

(56) References Cited

U.S. PATENT DOCUMENTS

| | | | | |
|---|---|---|---|---|
| 751,930 A | * | 2/1904 | Lundgren | 43/25 |
| 2,434,609 A | * | 1/1948 | Coffey | 43/25 |
| 2,848,778 A | * | 8/1958 | Plummer, Sr. et al. | 43/25 |
| 3,629,966 A | * | 12/1971 | Sanchez | 43/25 |
| 4,776,527 A | * | 10/1988 | Prowant | 43/25 |
| 5,029,409 A | | 7/1991 | Nouwens | |
| 5,218,779 A | * | 6/1993 | Morgan et al. | 43/25 |
| 5,375,788 A | * | 12/1994 | English | 43/25 |
| 5,513,463 A | * | 5/1996 | Drinkwater | 43/25 |
| 5,548,918 A | * | 8/1996 | Varrichione | 43/25 |
| 6,237,274 B1 | * | 5/2001 | Head et al. | 43/25 |

* cited by examiner

*Primary Examiner*—Thomas Price
(74) *Attorney, Agent, or Firm*—Akerman Senterfitt

(57) ABSTRACT

A fishing line loading device for loading new fishing line onto a fishing reel, such as casting and spinning reels. The loading device can be demountably coupled to fishing rods of different thicknesses and can be used to load new fishing line from supply spools of various circumferences onto a fishing reel. The loading device includes a frame and securing structure, either or both of which can employ a structural rib pattern. The securing structure secures a supply spool to the frame and applies functional drag resistance to the supply spool. The device also includes coupling structure which couples the frame to a fishing rod.

20 Claims, 4 Drawing Sheets

FISHING LINE LOADING DEVICE

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Field of the Invention

The present invention relates to the field of fishing accessories and more particularly to an apparatus that assists in the winding of new fishing line onto a fishing reel.

2. Description of Related Art

Historically, fishing enthusiasts have encountered difficulty in winding new fishing line onto fishing reels, in part because new fishing line that is being fed from a supply spool should be kept under tension to prevent tangling or kinking of the fishing line. Notably, modern monofilament fishing line, manufactured from lightweight plastic and wound on supply spools for retail sale, eventually develops a permanent bias resulting from its storage on a supply spool.

To avoid entanglement of fishing line, fishermen have traditionally relied on a second individual to aid in the reel loading process, in which one person holds the rod and reel assembly and winds the reel, while the other person supports the supply reel by inserting into the supply spool aperture a pencil, screwdriver or other elongated instrument. As the individual who is holding the rod and reel winds the new line from the supply spool, the person holding the supply spool applies resistance or drag to the fishing line fed from the supply spool to ensure a smooth, tight winding onto the reel.

Attempts to overcome these difficulties and eliminate the need for a second person in the loading process have resulted in the production of several fishing line loading devices. For example, U.S. Pat. No. 5,029,409 to Nouwens discloses a fishing line loading device comprising a U-shaped frame, a movable axle pin for mounting a fishing line supply spool and an attached, spring-loaded tension plate. The spring-loaded tension plate applies resistance to the circumferential edges of a supply spool, thereby providing the necessary supply line tension. Further, U.S. Pat. No. 5,513,463 to Drinkwater discloses a fishing line loading apparatus comprising an L-shaped frame, a spool axle for mounting a supply spool and a helical spring longitudinally mounted onto the spool axle. The helical spring applies frictional drag on the supply spool and can be used to adjust the supply line winding tension.

Significantly, the Nouwens loading device suffers from several disadvantages. One such disadvantage relates to the lack of industry standards regarding supply spools, which allows manufacturers to produce supply spools having a large variety of circumferences. As a result, the U-shaped frame in Nouwens must be several inches in width to accept relatively wide spools of fishing line, resulting in a bulky device. Consequently, the Nouwens frame is difficult to store in cramped tackle boxes. Furthermore, the non-adjustable spring-loaded tension plate in Nouwens may fail to provide the correct winding tension for all possible supply spool sizes.

The loading device disclosed in Drinkwater also has its drawbacks. For example, the device of Drinkwater utilizes an excessive number of components in an attempt to provide correct winding tension for many different supply spool sizes. The additional components complicate the Drinkwater system, resulting in increased manufacturing costs. In addition, the Drinkwater device is designed primarily to support supply spools weighing one-quarter pound and does not function effectively when supporting supply spools weighing more than one-quarter pound. Moreover, the fastening plates that secure the loading device to the fishing rod are flat and, thus, are incapable of providing a snug fit between the loading device and the rod. This structure can lead to overtorquing of the wingnuts used to tighten the fastening plates and may crush the fishing rod.

Another common disadvantage of prior art respooling devices is shown in both Nouwens and Drinkwater. The disclosure of each teaches systems geared towards loading new line onto a casting reel. Notably, neither is particularly suited for supplying new line onto spinning reels because the rotation of the fishing line at the supply spool is different from the rotation of the line at the spinning reel. Also, the frames of prior art systems are typically constructed of solid material. A solid structure, when constructed of plastic, leads to increased mold filling, packing and cooling times as well as significantly longer molding cycles. Moreover, the excess material increases the weight of the loading device which results in higher shipping costs. Thus, what is needed is a fishing line loading device capable of efficiently loading new fishing line onto both casting reels and spinning reels that accomplishes this important objective with a minimum number of components.

SUMMARY OF THE INVENTION

A fishing line loading apparatus for loading new fishing line onto a fishing reel, according to the invention, includes a frame, coupling structure for coupling the frame to a fishing rod, and securing structure for securing a supply spool to the frame wherein at least one of the frame and the securing structure employs a structural rib pattern. Also, the securing structure can apply a frictional drag resistance to the supply spool. Significantly, the fishing reel can be any type of reel, including either a casting reel or a spinning reel.

The frame can include a supply spool axle for engaging the supply spool, a support arm for supporting the supply spool axle, a base arm configuration, which can be t-shaped, from which the support arm extends, a fastening appendage extending from the base arm configuration, a fastening appendage extending from the supply spool axle and a notch adjacent to the fastening appendage for accommodating the fishing rod. This notch can be substantially semi-circular in shape and grooved or a combination thereof. Moreover, the supply spool axle can be threaded, and the fastening appendages can be threaded bolts.

Additionally, the securing structure can include a first washer positioned on the supply spool axle interposed between the support arm and the supply spool, and a second washer positioned on the supply spool axle interposed between the supply spool and a spring. Furthermore, this spring can be positioned on the supply spool axle. The securing structure can also include an engaging device mated to the supply spool axle, whereby the engaging device is in contact with the spring such that rotation of the engaging device controls the tension of the spring. This engaging device can be an axle nut. Also, a friction projection can be disposed along the base of the supply spool axle for frictionally engaging the first washer positioned on the supply spool axle.

The coupling structure can include a fastening plate having an aperture and a notch for accommodating the fishing rod. The notch in the fastening plate can be substantially semi-circular in shape and grooved or a combination thereof. The fastening plate can engage the fastening appendage such that the fishing rod is sandwiched between the notch of the fastening plate and the notch of the frame. In addition, the coupling structure can also include an engaging device, usually an axle nut, connectable on the fastening appendage for securing the fastening plate to the frame.

DETAILED DESCRIPTION OF THE PREFERRED EMBODIMENTS

Figure 1A:
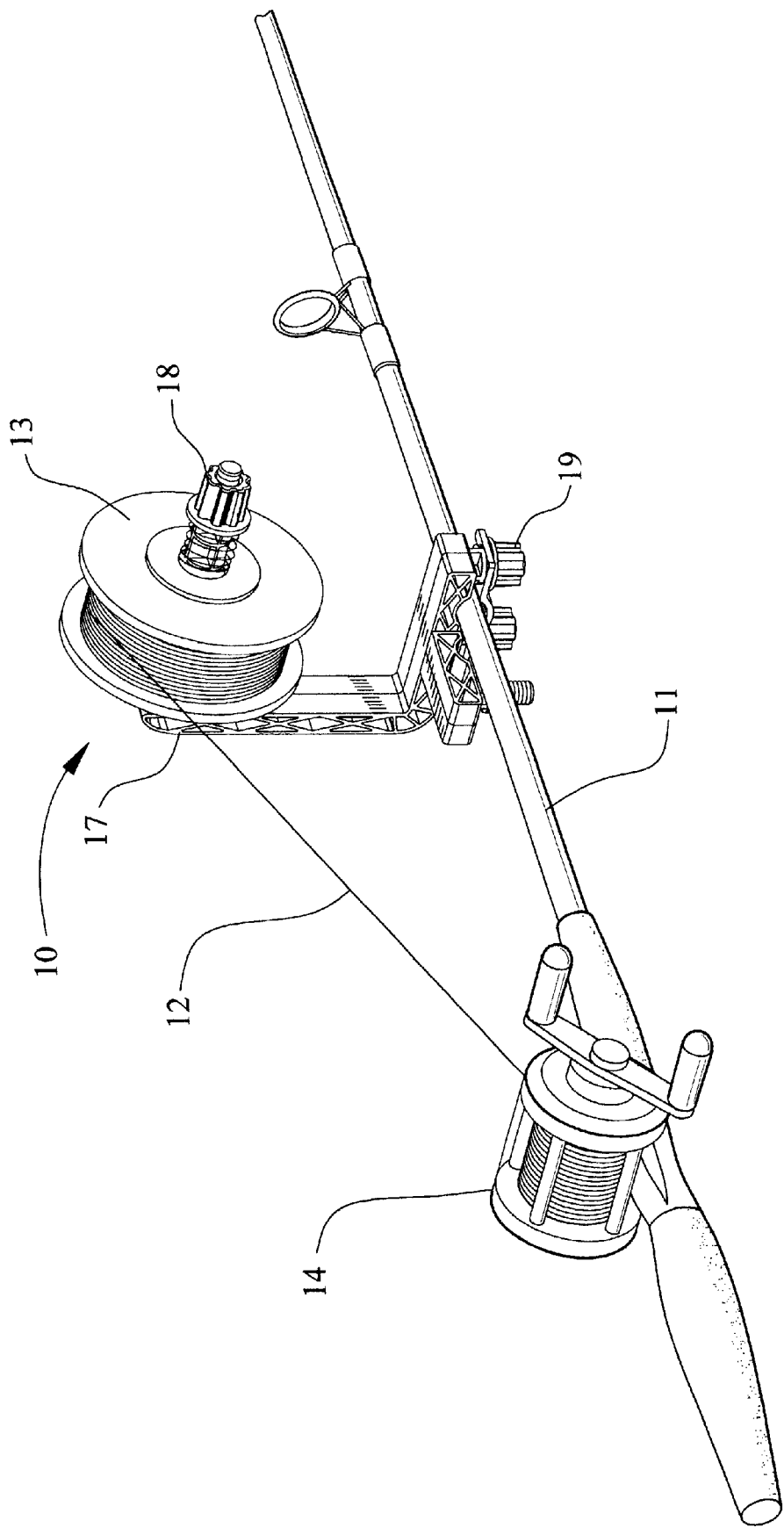
FIG. 1A shows a fishing line loading device in accordance with the present invention configured to load fishing line onto a casting reel.
Figure 1B:
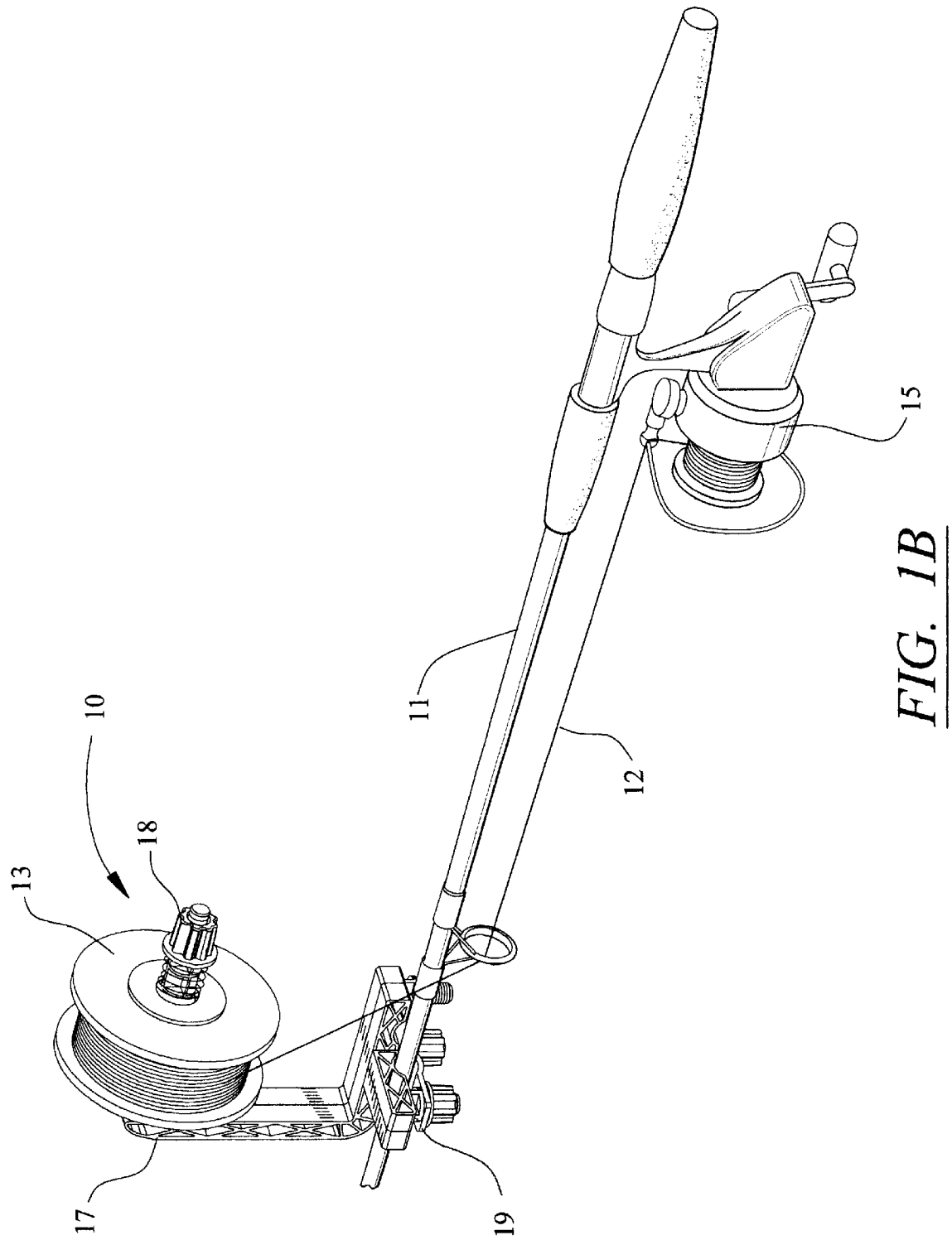
FIG. 1B shows a fishing line loading device in accordance with the present invention configured to load fishing line onto a spinning reel.

The present invention relates to a fishing line loading device for loading new fishing line onto a fishing reel. FIGS. 1A and 1B show a fishing line loading device 10 in accordance with the present invention mounted on a fishing rod 11. In FIG. 1A, a supply spool 13 supplies fishing line 12 to a casting reel 14. In FIG. 1B, a supply spool 13 supplies fishing line 12 to a spinning reel 15. As will be explained below, because of its unique design, the present invention can quickly and easily accommodate fishing rods of different thicknesses and can easily be removed from one type of reel, e.g., a casting reel, and transferred to another type, e.g., a spinning reel. Further, it is understood that the invention can be used on any type of reel.

The present invention includes a frame 17 and securing structure 18 which secures the supply spool 13 to the frame 17. In addition, the invention includes coupling structure 19 which couples the frame 17 to the fishing rod 11. The frame 17 can be composed of any suitable material, such as aluminum or steel. In one preferred arrangement, the frame 17 is composed of durable plastic.

Figure 2:
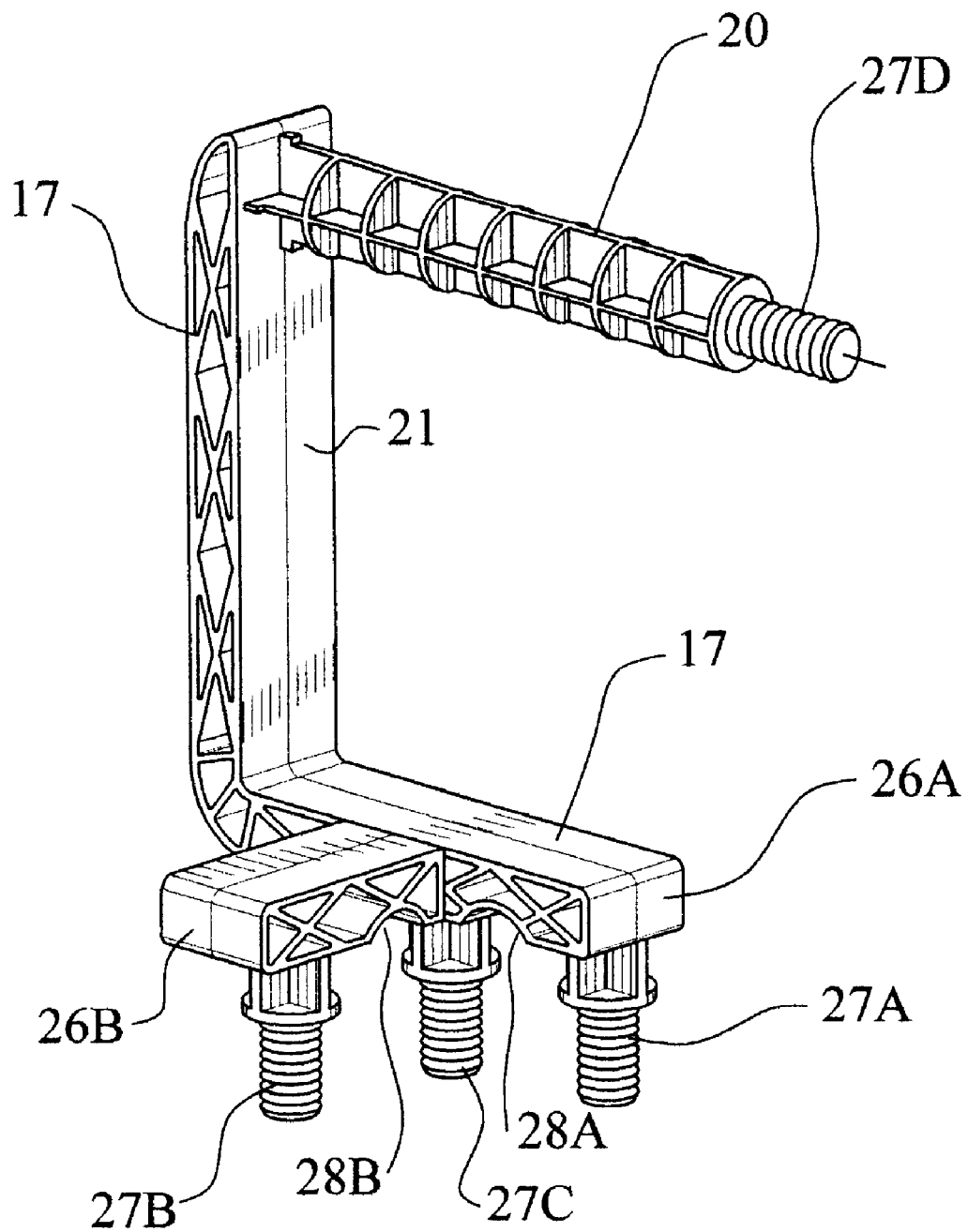
FIG. 2 shows a frame for supporting a supply spool axle in accordance with the present invention.

The frame 17 can have a structural rib pattern. As shown in FIG. 2, the structural ribs can extend through all or a portion of the width of the frame 17 and can be manufactured to extend along all or a portion of the length of the frame 17. Moreover, the structural ribs are not limited to any particular width, thickness or any other dimension. It is also understood that the invention's structural ribs are not limited to the intersection pattern displayed in FIG. 2, as any intersection pattern may be used. Employing a structural rib pattern can produce shorter mold filling, packing and cooling times, and dramatically accelerate molding cycles. In addition, this design results in less material consumption, lowering manufacturing and transportation costs, while advantageously increasing the strength of the frame 17 significantly. For example, in some cases, the structural rib pattern can provide a tenfold increase in strength. This increase in strength allows the present invention to accommodate supply spools of various circumferences and weights. For example, the invention can accommodate spools that weigh between one and ten pounds. It is understood, however, that the invention is not limited in that regard, as other weights are also acceptable.

The apparatus also includes a supply spool axle 20. The supply spool axle 20 can have a structural rib pattern. The structural rib pattern can have any configuration, including but not limited to those described hereinabove with respect to the frame 17. The supply spool axle 20 structural rib pattern uses less material and costs less to manufacture than a conventional spool axle, yet its design allows the frame 17 to support relatively heavy supply spools.

The supply spool axle 20 can have any shape, such as a circular or elliptical pattern. Further, a fastening appendage 27D can be attached at an end of the supply spool axle 20, or, alternatively, the supply spool axle 20 can be threaded, to assist in securing the supply spool 13 to the frame 17. It is important to note that the invention is not limited in either regard, as any number of mechanisms to assist in securing the supply spool 13 to the supply spool axle 20 can be used.

The frame 17 also has a support arm 21 for supporting the supply spool axle 20 and a base arm configuration from which the support arm 21 extends. The base arm configuration can consist of a plurality of base arms 26A, 26B. In this arrangement, the base arms are preferably in a t-shaped configuration.

In a preferred embodiment of the invention, fastening appendages 27A, 27C can be attached to the bottom of the base arm 26A, and fastening appendage 27B, can be attached to the bottom of the base arm 26B. The fastening appendages provide the mechanism for securing the loading device 10 to the fishing rod 11. In addition, the fastening appendages, 27A, 27B, 27C, 27D can be threaded bolts constructed of a material similar to that of the frame 17. A notch 28A can be located between the fastening appendages 27A, 27C. Likewise, a notch 28B can be located between the fastening appendages 27B, 27C. The notches 28A, 28B can be substantially semi-circular in shape, which provides a better fit between the loading device 10 and the fishing rod 11 than that of a conventional flat face plate.

Figure 3:
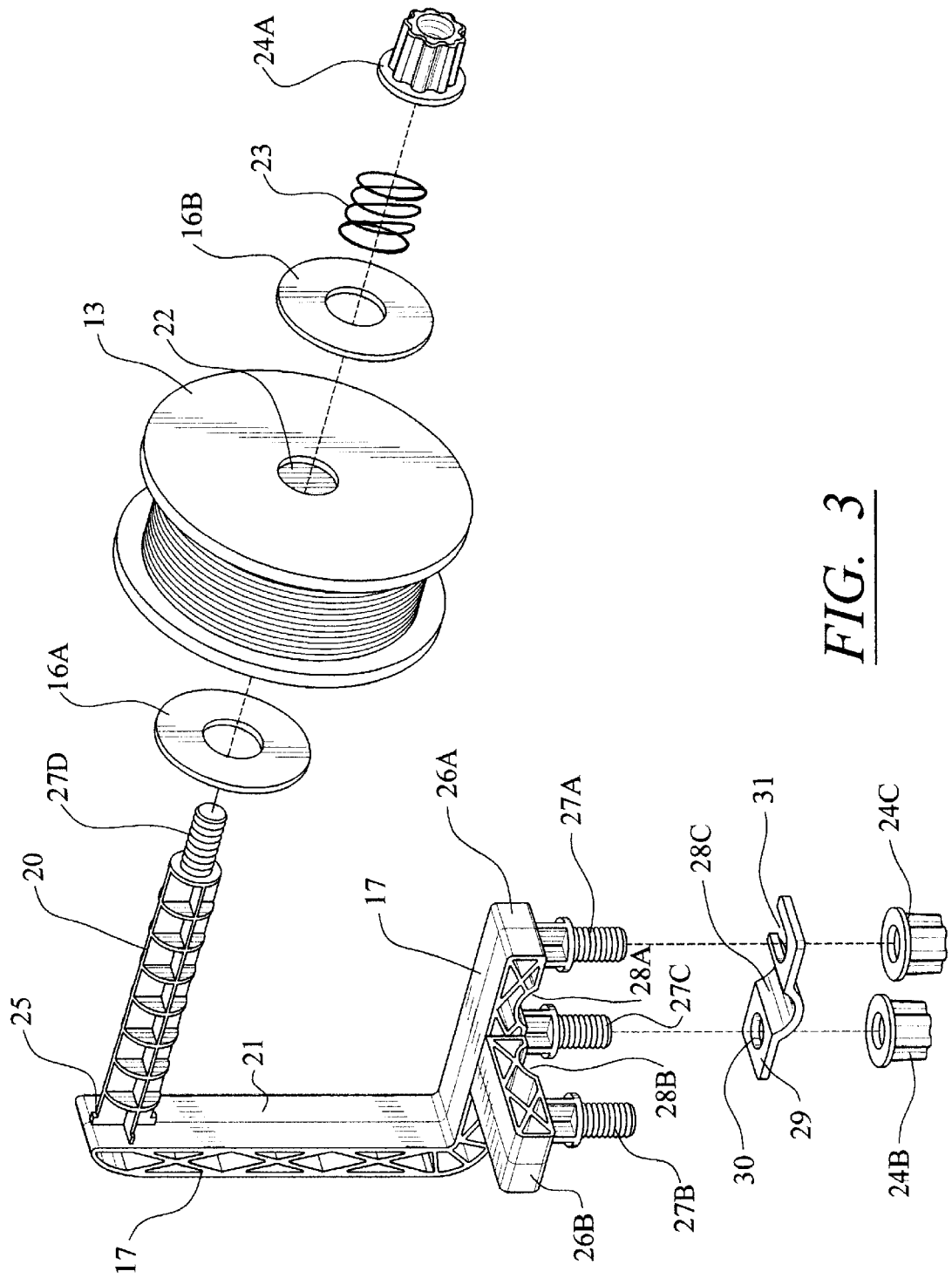
FIG. 3 shows an exploded view of a fishing line loading apparatus in accordance with the present invention.

As shown in FIG. 3, in one arrangement of the invention, a first washer 16A, which can be composed of any suitable material such as durable plastic, is mounted on the supply spool axle 20. The supply spool 13 can then be mounted on the supply spool axle 20 by inserting the supply spool axle 20 through a supply spool aperture 22. After the supply spool 13 is engaged by the supply spool axle 20, a second washer 16B can be mounted on the supply spool axle 20 followed by a spring 23. Subsequently, the assembly can be secured by mating an engaging device 24A with the supply spool axle 20. The engaging device 24A can be any structure suitable for securing the assembly, such as the axle nut shown in FIG. 3. Additionally, the engaging device can be composed of plastic.

The supply spool 13 can be interposed between and in frictional engagement with the washers 16A, 16B. Further, the spring 23 can supply, through the washer 16B, an adjustable, compressive frictional force to the supply spool 13. As a result, the user can select the proper amount of winding tension by tightening or loosening the engaging device 24A.

According to a preferred embodiment of the invention, at least one friction projection 25 can be disposed along the base of the supply spool axle 20. Once the supply spool 13 is properly seated, the washer 16A can be in direct contact with the friction projection 25. The friction projection 25 can frictionally engage the washer 16A, yet because of its design can prevent excessive heat build-up at the point of contact between the washer 16A and the support arm 21 of the frame 17.

To load fishing line onto a casting reel 14 (not shown), a portion of the fishing rod 11 can be placed in the notch 28A, which can be located between the fastening appendages 27A, 27C. The fastening appendage 27C can then be engaged by a fastening plate 29 which can contain at least one aperture, preferably two. The fastening appendage 27C can be inserted through an aperture 30 of the fastening plate 29, and the fastening appendage 27A can be inserted through a second aperture 31 of the fastening plate 29. In a preferred arrangement, aperture 31 is semi-circular or semi-elliptical in shape. Similar to the base arms 26A, 26B, the fastening plate 29 can contain a notch 28C, which can be semi-circular or semi-elliptical in shape. The fastening plate 29 can be forced towards the fishing rod 11 until the fishing rod 11 is sandwiched between the notches 28A, 28C. In a preferred embodiment of the invention, once the fastening plate 29 is in place, engaging devices 24B, 24C can be properly rotated on the fastening appendages 27A, 27C to secure fastening plate 29 to the loading device frame 17. Engaging devices 24B, 24C can be axle nuts similar to the supply spool axle engaging device 24A.

The process of loading fishing line onto a spinning reel can be conducted in a similar fashion. In particular, a portion of the fishing rod 11 can be placed in the notch 28B located between the fastening appendages 27B, 27C. The fastening appendage 27C can be inserted through the aperture 30 of the fastening plate 29, and the fastening appendage 27B can be inserted through the aperture 31 of the fastening plate 29. The fastening plate 29 can then be forced towards the fishing rod 11 until the fishing rod 11 is sandwiched between the notches 28B, 28C. Once the fastening plate 29 is in place, the engaging devices 24B, 24C can be properly rotated on the fastening appendages 27B, 27C to secure the fastening plate 29 to the loading device frame 17.

In addition to including a design that provides an improved fit for securing the loading device 10 to the fishing rod 11, each of the notches 28A, 28B, 28C can be grooved to prevent the fishing rod 11 from being crushed due to excessive torquing of the engaging devices 24B, 24C. Furthermore, because the fastening plate 29 can contain a semi-circular aperture, the fastening plate 29 can be employed as a swinging gate, thus allowing quick and easy mounting of fishing rods of different thicknesses in either the spinning reel or casting reel configuration. Moreover, the unique positioning of fastening appendages 27A, 27B, 27C allows for the use of a single fastening plate for mounting a supply spool and allows quick transfer of the loading device 10 from one type of reel to another. As a result, the rotation of the line at the supply spool and the rotation of the line at the reel can be the same when loading different types of reels, such as casting or spinning reels.

While the preferred embodiment of the invention has been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A fishing line loading apparatus for loading new fishing line onto a fishing reel, comprising:
    a generally C-shaped frame comprising a base arm, wherein said base arm has a generally C shaped configuration; a support arm extending from said base arm; and a supply spool axle extending from said support arm, wherein said supply spool axle has a free end extending outwardly beyond a supply spool during use of said apparatus;
    securing structure, said securing structure attachable to said free end of said supply spool axle for securing the supply spool to said supply spool axle, whereby wherein said securing structure applies includes a flange to apply frictional drag resistance to the supply spool; and
    coupling structure, said coupling structure for coupling said base arm to a fishing rod;
    wherein at least one of said frame and said securing structure employs a structural rib pattern.

2. The apparatus according to claim 1, wherein said frame further comprises:
    a fastening appendage extending from said base arm;
    a fastening appendage extending from said supply spool axle; and
    a notch adjacent to said fastening appendage for accommodating said fishing rod.

3. The apparatus according to claim 2, wherein said supply spool axle is threaded.

4. The apparatus according to claim 2, wherein said base arm is t-shaped.

5. The apparatus according to claim 2, wherein said notch is substantially semi-circular in shape.

6. The apparatus according to claim 2, wherein said fastening appendage is a threaded bolt.

7. The apparatus according to claim 2, further comprising at least one friction projection disposed along the base of said supply spool axle.

8. The apparatus according to claim 2, wherein said notch is grooved.

9. The apparatus according to claim 1, wherein said securing structure comprises:
    a first washer positioned on said supply spool axle interposed between said support arm and said supply spool;
    a second washer positioned on said supply spool axle interposed between said supply spool and a spring, said spring positioned on said supply spool axle; and
    an engaging device mated to said supply spool axle, whereby said engaging device is in contact with said spring such that rotation of said engaging device controls the tension of said spring.

10. The apparatus according to claim 1, wherein said coupling structure comprises:
    a fastening plate having an aperture;
    a notch for accommodating the fishing rod, whereby said fastening plate engages said fastening appendage such that said fishing rod is sandwiched between said notch of said fastening plate and said notch of said frame; and
    an engaging device connectable on said fastening appendage for securing said fastening plate to said frame.

11. The apparatus according to claim 9, wherein said engaging device is an axle nut.

12. The apparatus according to claim 10, wherein said aperture of said fastening plate is substantially semi-circular in shape.

13. The apparatus according to claim 10, wherein said notch of said fastening plate is substantially semi-circular in shape.

14. The apparatus according to claim 10, wherein said notch of said fastening plate is grooved.

15. The apparatus according to claim 10, wherein said engaging device is an axle nut.

16. The apparatus according to claim 1, wherein said reel is a spinning reel.

17. The apparatus according to claim 1, wherein said reel is a casting reel.

18. The apparatus according to claim 1, further comprising a friction projection disposed along the base of said supply spool axle.

19. A fishing line loading apparatus for loading new fishing line onto a fishing reel, comprising:

a frame;

securing structure, said securing structure securing a supply spool to said frame, whereby said securing structure applies frictional drag resistance to said supply spool;

wherein at least one of said frame and said securing structure employs a structural rib pattern;

coupling structure, said coupling structure coupling said frame to a fishing rod;

a supply spool axle for engaging said supply spool, said supply spool axle disposed through an aperture of said supply spool;

a support arm for supporting said supply spool axle;

a T-shaped base arm configuration from which said support arm extends in a first direction; and a fastening appendages extending from said base arm configuration in a second direction, said fastening appendage including said coupling structure;

wherein said frame is rotatable about said base arm fastening appendage, whereby the apparatus is attachable to the fishing rod in perpendicular and parallel orientations relative to the fishing rod.

20. The apparatus according to claim 1, wherein the structural ribs are at least partially comprised of plastic.

* * * * *